United States Patent [19]

Bergmann

[11] Patent Number: 5,414,785
[45] Date of Patent: May 9, 1995

[54] OPTICAL DATA BUS HAVING COLLISION DETECTION CAPABILITY

[75] Inventor: Ernest E. Bergmann, Fountain Hill, Pa.

[73] Assignee: AT&T Corp., Murray Hill, N.J.

[21] Appl. No.: 120,617

[22] Filed: Sep. 13, 1993

[51] Int. Cl.$^6$ ............................ G02B 6/00; G02B 6/36
[52] U.S. Cl. ...................... 385/24; 359/127; 250/227.11
[58] Field of Search ............... 359/127, 130, 131, 155, 359/154, 110, 111; 385/12, 14, 24, 25, 40, 88; 250/227.11, 551

[56] References Cited

U.S. PATENT DOCUMENTS

| | | | |
|---|---|---|---|
| 4,281,253 | 7/1981 | Culver | 385/24 X |
| 4,695,121 | 9/1987 | Mahapatra et al. | 385/14 X |
| 4,800,262 | 1/1989 | Lentine | 250/211 |
| 4,901,306 | 2/1990 | Gardner | 370/3 |
| 4,904,050 | 2/1990 | Dunn et al. | 385/24 |
| 4,912,523 | 3/1990 | Refi et al. | 455/607 |
| 4,914,866 | 4/1990 | Jackson et al. | 51/72 |
| 4,919,509 | 4/1990 | Miller et al. | 350/96.21 |
| 4,955,976 | 9/1990 | Freeman et al. | 350/96.21 |
| 5,195,162 | 3/1993 | Sultan et al. | 385/130 |

OTHER PUBLICATIONS

Steven K. Korotky and Rodney C. Alferness, "Integrated Optic Technology", pp. 169–227, Integrated Optical Circuits and Components (Design and Applications), 1987.

K. H. Tietgen and R. Th. Kerstein, "180° Turns In Integrated Optics", Optics Communications, Feb. 1981, pp. 281–284.

Edmond J. Murphy, "Fiber Attachment For Guided Wave Devices", Reprinted from Journal of Lightwave Technology pp. 862–871, vol. 6, No. 6, Jun. 1988.

Herwig Kogelnick and Ronald V. Schmidt, "Switched Directional Couplers With Alternating $\Delta\beta$", IEEE Journal of Quantum Electronics, vol. QE-12, No. 7, Jul. 1976.

Primary Examiner—Akm E. Ullah

[57] ABSTRACT

An optical fiber communication system comprises a bus to which are connected two or more individual stations with inputs from the bus and outputs to the bus. Each station includes an optical coupler, folded by means of a partially transmissive mirror, wherein the inputs and outputs are optically coupled. A light energy source applies optical energy to the bus which passes through each station by means of the optical coupler associated therewith. Each station includes means for modulating the light energy on the bus by varying the optical coupling, and each station has detector means for receiving optical energy passing through the mirror and detecting the presence or absence of modulated signals on the bus. Control means at each station initiates operating commands on the basis of the energy detected by the detector means.

17 Claims, 3 Drawing Sheets

OPTICAL DATA BUS HAVING COLLISION DETECTION CAPABILITY

FIELD OF INVENTION

This invention relates to optical communication systems and, more particularly, to an optical fiber network arrangement for communications among a plurality of stations.

BACKGROUND OF THE INVENTION

Present day network systems, such as local area (LAN), metropolitan area (MAN), and wide area (WAN), generally utilize electrical signal transmission arrangements wherein switching, modulation, demodulation, and the like are all performed electrically. However, the emphasis is now upon developing optical arrangements for such networks because of the numerous advantages inherent in optical signaling and transmission. Optical systems are generally immune to the effects of electrical radiation, do not produce electromagnetic interference (EMI), have no ground loop problems, and, generally, optical fiber has less signal attenuation over a given distance than co-axial cable.

A local network known as ALOHA is an example of a local area network (LAN) upon which much effort has been expended in converting it and derivatives thereof from electrical to optical transmission. The ALOHA network, based upon wireless transmission with a common radio frequency, was an early LAN approach in which stations were transmitting whenever they had information to communicate. "Collisions" occurred whenever there were two or more stations transmitting at the same time, not by design. A station did not "know" that it had transmitted successfully unless it received a confirmation or acknowledgment within a reasonably short time after the transmission.

Subsequent to the development of ALOHA was the development of a Media Access Control (MAC) protocol for use with stations connected to a common coaxial cable electrical bus using a Carrier Sense Multiple Access with Collision Detection (CSMA/CD) scheme which represented an improvement over the ALOHA scheme. With CSMA/CD, local area networks, for example, experience fewer collisions, and, when collisions do occur, a station detecting a collision directly will stop transmitting the remainder of its message packet. Statistical analysis shows that the CSMA/DC media access control protocol has twice the average through-put at optimum loading than ALOHA for the same speed of transmission. Also, with CSMA/CD, a station does not need to wait for a confirmation message to know that it has been successful in sending its message. This is a direct result of the collision detection feature. The station only transmits when the line is clear, and, having detected no collision during transmission, it can assume that the transmission was successful. A widely used form of LAN, Ethernet®, operates on the CSMA/CD protocol. A station wishing to transmit listens to the transmission medium to determine if it is in use, i.e., if another transmission is in progress. If the medium, e.g., coaxial cable bus, is idle, the station transmits. However, if the medium is in use, the station waits for a predetermined randomly chosen period of time before trying again. A variation of the CSMA/CD mode is known as the 1-persistent protocol, wherein the station commences to listen, and, even if the medium is in use, continues to listen until the medium comes clear, at which time the station transmits. The 1-persistent protocol is analogous to a group of people seated around a table and conversing. If two stations, or persons, attempt to transmit or speak simultaneously a collision occurs, which they both detect, and they both stop transmitting or speaking, to try again after an elapsed time which is randomly different for the two stations, just as two people who attempted to speak at the same time would both stop, and delay trying to talk again for randomly delayed times.

Thus, if the "physical layer" of the communication network (the details of the transmission medium, signaling, receiving, and the ability to receive and detect collisions) can support the CSMA/CD MAC protocol, a fiber optic system promises better performance of a shared medium network than does an electrical system.

In the conversion of the Ethernet® or like systems to optical transmission, the individual stations have generally comprised a receiver and a separate transmitter which includes its own light source, i.e., laser or light emitting diode (LED), for example. With the stations so configured, and with each having a randomizable timing circuit, the advantages of Ethernet® or other CSMA/CD type local network can be realized to the fullest. The receiver "listens", while the transmitter waits in state of readiness. When the medium (optical bus) is clear, the light from the station light source is modulated with a signal and transmitted. Other stations along the bus receive the transmitted signals and wait their turn to transmit. Thus, an optical CSMA/CD local network is realized which utilizes the advantages of simplicity characteristic of an Ethernet® network, but which requires individual light sources and separate receivers at each station.

SUMMARY OF THE INVENTION

The principles and features of the present invention, to be discussed hereinafter, will be explained with reference to an embodiment thereof in an Ethernet® type local network, but they are applicable to other "bus" embodiments as well.

In the network of the preferred embodiment, a plurality of local stations are sequentially positioned along, and connected to, an optical fiber bus as the transmission medium. Each station comprises a modulator, such as, for example, a titanium diffused lithium niobate (LiNbO$_3$) waveguide element having an input lead from the bus and an output lead to the bus. The LiNbO$_3$ crystal substrate has diffused therein first and second titanium formed waveguides extending parallel to each other and in sufficiently close proximity to couple optically to each other. The two waveguides extend along the crystal for distance of approximately one-half the coupling distance or an odd multiple thereof, terminating at one face of the crystal, where the coupling distance is defined as that distance where the signal in one guide would be substantially completely transferred to the second guide. For polarization independent coupling it is necessary to insure that each polarization individually satisfies the foregoing. A partially transmitting mirror is located on that one face of the crystal, so that an optical signal input at the input lead of the crystal will be partially transferred to the guide connected to the output lead, reflected by the mirror, and finally totally applied to the output lead. Thus, the mirror performs the function of folding the directional coupler formed by the two waveguides. A modulating electrode or electrodes is deposited over the top surface of the crystal for applying modulating signals to the two waveguides. The mirror is made to be partially transmitting so that some light in the waveguides passes through the mirror, and a photo-detector element is mounted or otherwise positioned adjacent the mirror for detecting the signals which pass therethrough.

The network has a single optical energy source, e.g., laser, at one end thereof, which directs a light wave along the bus to each of the stations in the network. When none of the stations is waiting to transmit, the light wave traveling on the bus is received by each station on the input lead and is coupled to the output lead, as explained heretofore, and reapplied to the bus, with a fraction of the optical energy passing through the mirror to the detector at each station. Thus, each station, through its detector and associated circuitry is made to realize that the bus, or rather, the optical energy thereon, is not carrying any signal. When a station is ready to transmit, the signal, whether analog or digital, is applied to modulating electrodes deposited on the crystal. The gap between the electrodes across which the electrical modulating signal is applied is so centered over the waveguides in the waveguide coupling region that the modulating electric field has an effect on one guide that is different than on the other guide due to the difference in direction of the electrical field. The modulating voltage thus varies the transmission characteristics of the one guide relative to the other guide, and hence, the degree of coupling between the guides. Thus, the light energy applied to the output lead is a signal which varies in accordance with the variations in coupling. This modulated signal passes on to the other stations located "downstream" of the transmitting station. At the same time, an inverted modulated signal is applied to the input lead of the crystal and passes back to the stations "upstream" of the transmitting station. Each station in the network, therefore, receives and detects the modulated optical energy but the transmitting station does not detect its own transmission. Circuitry associated with each station causes the receiving stations to monitor the bus and, when ready to transmit, to wait until no modulated signal is received at which time the station commences to transmit. In accordance with the CSMA/CD protocol, in the case where more than one station is waiting to transmit as soon as the line is idle, both may attempt to transmit simultaneously which results in collision. Thus, in the CSMA/CD protocol system of the present invention, this is remedied by having the circuitry of each station delay transmission, even after the bus goes idle, for a random amount of time. Since the delays are random, usually any two stations will have different delays. In addition, if a collision does occur, both stations, which monitor the bus even while transmitting, cease transmitting and remain silent for a random time before attempting to transmit again. Thus, the two stations involved in a collision are not apt to cause a collision again.

The system of the present invention, in the illustrative embodiment thereof, does not require a source of optical energy at each station, does not require a precise detector alignment at the stations, and does not require large amounts of electrical power at the stations inasmuch as modulation is by voltage alone. It is applicable to both analog and digital signal transmissions, and, inasmuch as each $LiNbO_3$ crystal is coupled to the bus on only one end or side, does not require more than one array of precisely aligned couplers. The system is both simple and economical and yet is reliable and capable of high speeds of operation. Because there is considerable energy loss in any such system, it is desirable to amplify the signals on the bus at periodic intervals. This is most commonly accomplished in most system through the use of erbium doped fiber sections located along the bus. Such sections, or amplifiers may cause noise resulting from amplified spontaneous emission (ASE) within the amplifier. In the present invention, because there is an optical wave on the bus at all times from the single light source, the ASE is negligible. An additional advantage of the use of erbium doped fiber amplifiers arises from the capability of such sections of amplifying signals traveling in either direction.

In a variation of the preferred embodiment of the invention, standby fight sources are positioned at either end of the network with suitable detecting and switching means to switch a standby light source onto the bus when the principal light source fails for whatever reason.

These and other features and advantages of the present invention will be more readily apparent from the following detailed description, read in conjunction with the accompanying drawings.

DETAILED DESCRIPTION

Figure 1:
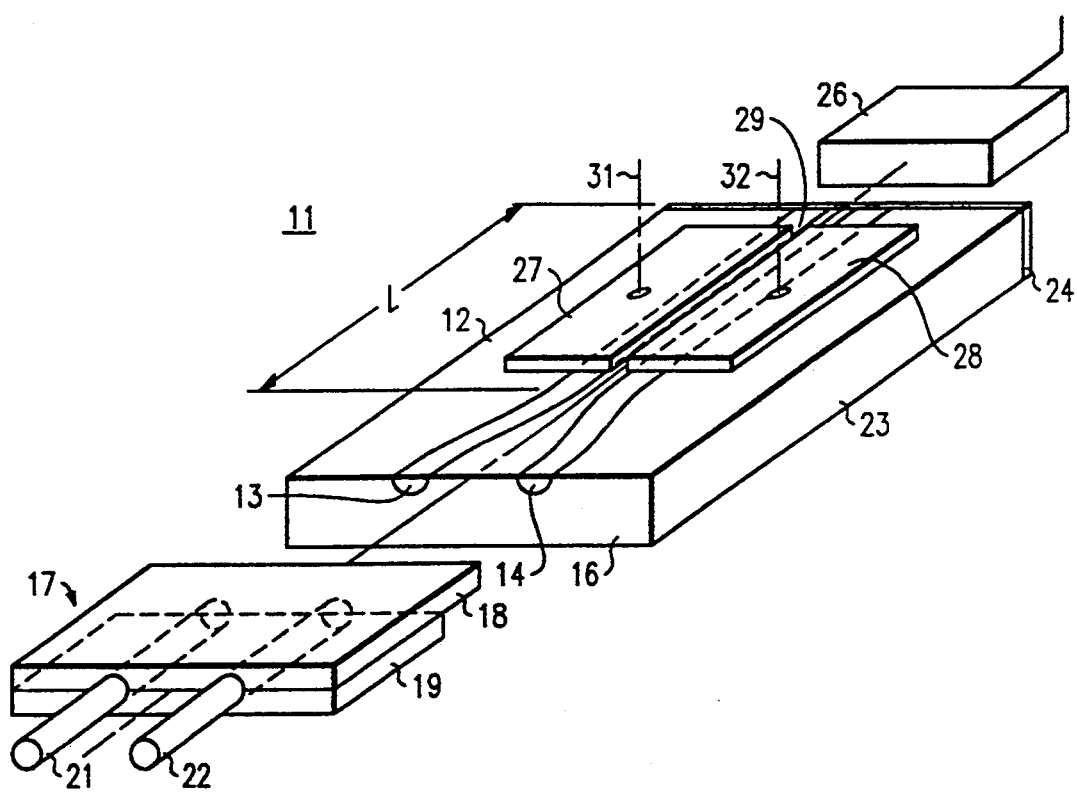
FIG. 1 is a perspective view of a basic building block of the present invention.

In FIG. 1 there is shown the basic element 11 of a single station in the preferred embodiment of the invention. Element 11 comprises a crystal 12 of electro-optic material, preferably lithium-niobate ($LiNbO_3$) having first and second titanium optical waveguides 13 and 14 different therein. Such devices and the methods of making them are shown and described in "Integrated Optical Circuits and Components, Design and Applications" edited by Lynn D. Hutcheson, Marcel Dekker, Inc., 1987, Chapter 6; and in "Optical Fiber Telecommunications II", Academic Press, Inc., 1988, Chapter 11. As is pointed out in those references, other types of materials, such as Fe-doped In Ga As P/InP might also be used, but $Ti_iLiNbO_3$ is the preferred material in the present invention.

As shown in FIG. 1, waveguides 13 and 14 are, at the input end 16 of crystal 12, spaced apart a sufficient distance to enable reliable coupling thereto by means of a coupler 17. Coupler 17 may be any of a number of types, that are shown being similar to the coupler types having low insertion loss shown in "Fiber Attachment for Guided Wave Devices" by Edmond J. Murphy, Journal of Lightwave Technology, Vol. 6, No. 6, June, 1988, pp. 862–871. Coupler 17 comprises first and second silicon chips 18 and 19 which precision couple an input optical fiber 21 to waveguide 13 and an output optical fiber 22 to waveguide 14. As can be seen in FIG. 1, waveguides 13 and 14 which typically are separated by 250 microns center to center bend inward toward the centerline of crystal 12 and extend parallel and in close proximity to each other, i.e., from 2 to 10 microns, along the length of the crystal, thereby forming within the crystal-waveguide member a directional coupler.

Directional couplers of this type are shown and described in "Switched Directional Couplers with Alternating $\Delta\beta$", by Herwig Kogelnik et al. IEEE Journal of Quantum Electronics, Vol. QE-12, No. 7, July 1976, at pp. 396–401. In the element 11 of FIG. 1, the length L of the region wherein the guides 13 and 14 couple is preferably made to be approximately one-half or odd multiple thereof of the coupling length l as discussed in the Kogelnik et al. article, hence, an optical wave inputted on guide 13 will not completely transfer to guide 14 before the end 23 of crystal 12. End 23 has affixed thereon a partially reflecting mirror 24 which passes approximately five percent (5%) of the light impinging thereon and reflects the remainder. As a consequence, the reflected light continues to couple from guide 13 to guide 14, and, in the absence of any modulating signal, emerges from crystal 12 via guide 14. Thus, the directional coupler is, in effect, folded by the action of mirror 24. Folded directional couplers are shown in "180°—Turns in Integrated Optics" by Tietgen et al., Optics Communications, Vol. 36, No. 4, 1981, pp. 281–284. As was discussed hereinbefore, and will be further discussed hereinafter, the light passing through mirror 24 and existing crystal 12 is detected by detection means 26, which may take any one of a number of forms known in the art. Detector 26 is of a size and nature such that it does not need to be precisely aligned with the axis of crystal 12.

Deposited or otherwise mounted on crystal 12 are first and second modulating electrodes 27 and 28 in the form of flat plates which extend parallel to guides 13 and 14 along at least a portion of the coupling region. Electrodes 27 and 28 are spaced from each other by a gap 29 which is centered over the centerline of crystal 12 and extends parallel thereto. Connected to electrode 27 is an electrical lead 31, and electrode 28 has connected thereto a lead 32, for the application of modulating voltages, as will be discussed more fully hereinafter.

Figure 2:
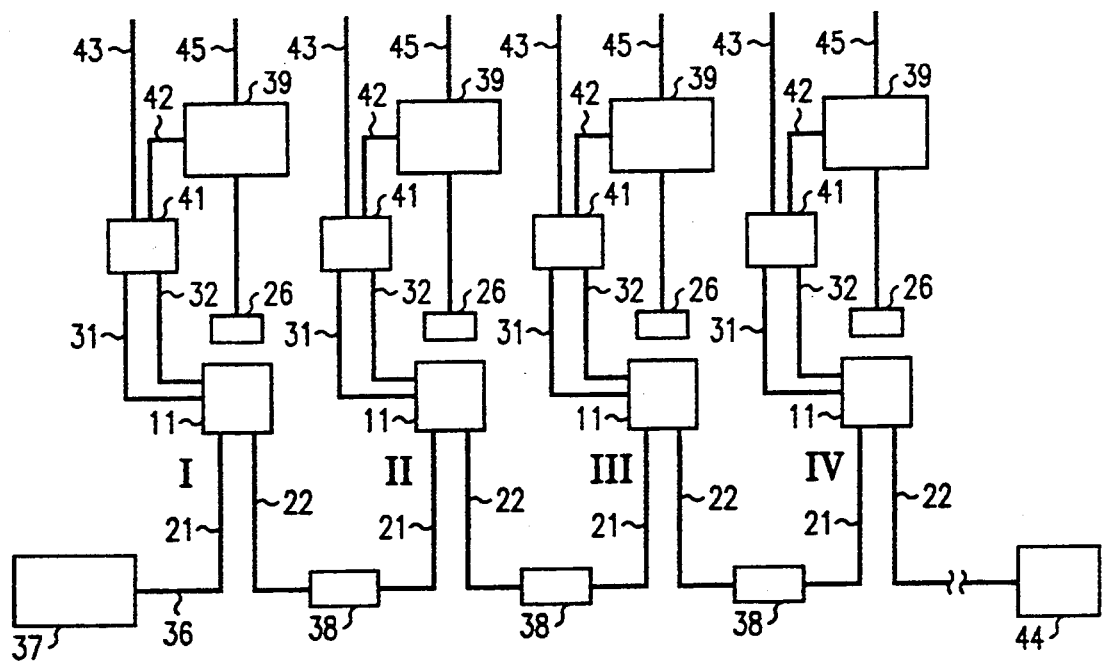
FIG. 2 is a block diagram schematic of a network circuit embodying the principles of the present invention.

In FIG. 2 there is shown a block diagram of a station network embodying the principles of the present invention, comprising four substantially identical stations, I, II, III and IV. Each of the stations has the basic station 11, connected via input optical fiber 21 and output optical fiber 22 to an optical fiber bus 36. The number of stations will, in practice, depend upon the extent of the network, those shown in FIG. 2 being for illustrative purposes only. A source 37 of optical waves or energy is connected at one end of the bus 36 and directs light therealong. Located along bus 36 between stations are erbium doped amplifier sections 38,38 which, as pointed out hereinbefore, amplify the signals traveling along the bus. The exact number and location of the sections 38,38 depends upon the extent of the system or network and the demands thereof, those shown in FIG. 2 being for illustrative purposes only.

At each station, the output of the detector 26 is connected directly to a computing or command module 39 which operates in the CSMA/CD protocol, as discussed in the preceding. Also, each station has a signal processing module 41 for signal processing, i.e., sending and receiving signals on bus 36. Module 41 is connected to the modulating or basic unit 11 via leads 31 and 32, and also is directly connected to module 39 via lead 42 for receiving command signals from the module 39. Signal inputs and outputs to the individual stations are applied to or extracted from module 41 by means of connections 43 and 45 respectively. A beam dump 44 or other means of disposing the light waves on bus 36 is provided at the far end of bus 36. It is understood that module 41 has memory or other means for storing the signal until transmission is enabled by control 39 through connection 42.

In operation, where there is no modulating signal, e.g., telephone conversation, digital data, or the like, on any of the stations, the optical energy from light source 37 is applied to station I via fiber 21, reflected by mirror 24 shown in FIG. 1, and exits station I via fiber 22. A small fraction of the energy is detected by detector 26 and applied to module 39. If none of the stations II, III and IV is transmitting, module 39 recognizes that the bus is clear for signal transmission, as is the case at stations II, III and IV.

When one of the stations, e.g., station III, receives a signal for transmission, module 39 "orders" signal processing module 41 to transmit, and the unit 11 receives a modulating voltage from module 41 which is applied to electrodes 27 and 28, shown in FIG. 1. The electric field thus applied to the electrodes varies the transmission characteristics of the guides 13 and 14, shown in FIG. 1, i.e., the index of refraction of the guides, to a different degree due to the direction of the field on one guide being different from the direction of the field on the other guide, and hence, the coupling between the guides is varied. These variations constitute a modulation of the power on bus 36. The modulated power exits station III via lead 22 and is applied to station IV, which detects the modulated signal and its command module 39 prevents signal processing module 41 from applying any signals to unit 11. At the same time, an inverted modulated signal exits station III via lead 21 and is applied to station II which likewise goes into a "wait" mode. The modulated optical wave is reflected by station II and applied to station I which also goes into the "wait" mode. Thus, with the arrangement of FIG. 2, wherein each station comprises the basic element 11 of FIG. 1 and the detector 26 and command modules 39, for the example just discussed, where only one station is transmitting, there can be no collision by definition. On the other hand, in the case where stations II and III, for example, simultaneously, or nearly so, commence to transmit, such transmission is virtually immediately detected by both stations, indicating a collision, and both stations are immediately stopped from transmitting by their respective command modules 39,39. The delay for each station is random in nature, and usually different from the other station, hence, after a delay, one of the stations will commence transmitting again before the other, thereby blocking that other station from transmitting. The system shown in FIG. 2 is a highly reliable and efficient arrangement, whether there are only two stations on the bus or a multiplicity of stations, for example, eight, eleven, twelve, fifteen, or even twenty-four, or more.

Figure 3:
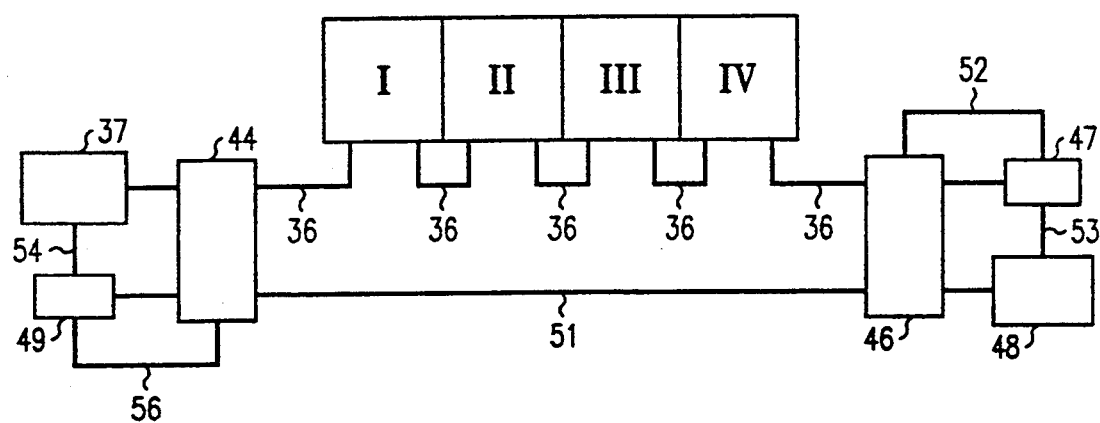
FIG. 3 is a block diagram schematic of a modification of the network system of FIG. 2.

The system of FIG. 2 can be made even more reliable by the introduction of redundancy. Thus, instead of a single light source 37, two or more light sources might be used, connected in parallel, with a switching arrangement for switching therebetween. In FIG. 3, there is shown a preferred arrangement for introducing redundancy into the system, thereby increasing its reliability.

The system of FIG. 3 comprises the station arrangement as shown and described with regard to FIG. 2. However, the optical energy from source 37 first passes through a 2×2 optical switch 44 before entering onto bus 36, and at the far end of the array through a second 2×2 optical switch 46 and to a detector 47. A detector 49 is also connected to one port of switch 44, and a light source 48 is connected to one port of switch 46. The fourth ports of the two switches 44 and 46 are connected together by a test bus 51. In operation, light wave energy passes from source 37 along bus 36 to stations I, II, III and IV, and through switch 46 to detector 47. If source 37 fails or its light output otherwise becomes inadequate, detector 47 and its associated circuitry sends a signal to light source 48 over lead 53, turning it on, and to switch 46 over lead 52 to switch the light output of source 48 onto bus 36. When this occurs, a signal may also be sent to detector 49, over test bus 51, for example, causing it to send a switching signal to switch 44 over lead 56 to switch light source 37 out of the circuit and detector 49 into the circuit to monitor the light output of source 48. Thus, the system is protected against a breakdown or failure of a light source, and operation continues substantially without interruption. Test bus 51 also makes it possible to test light source 48 "off-line", i.e., even while light source 37 and the remainder of the systems are operating normally.

The system of the present invention using the basic element 11 shown in FIG. 1 is capable of high speed operation with a high degree of reliability, does not require multiple light sources, does not require large amounts of power, :and is both simple and economical. It retains all of the advantages of fiber optic performance in adapting a CSMA/CD type network to fiber optic operation. The system of the invention has been shown wherein the CSMA/CD protocol is used. The invention is also adaptable for use with other protocols as well.

The invention has been disclosed in a preferred embodiment thereof for purposes of illustrating the features and principles involved. Numerous changes or modifications might readily occur to workers in the art without departure from the spirit and scope of the invention. For example, the various components of each station have been shown separately. With the state of technology today, many of these components and their functions might be embodied in, for example, a single integrated circuit chip having the capability of performing the numerous disclosed functions. In those instances where more than one bus is involved, a plurality of the directional couplers can be ganged on a single substrate, and operate either independently of or in a coordinated manner with each other.

I claim:

1. An optical fiber communication system having two or more individual stations for the transmission of information signals between the stations comprising:
   an optical fiber bus for optically connecting said stations in a series array having an input to each of said stations and an output separate from said input from each of said stations;
   a light source for substantially continuously applying light energy independently of said stations to said bus and to each of said stations in seriatim in a first direction, said source being independent of the stations in the system;
   each of said stations further having modulating means for modulating optical energy received from said bus in accordance with a modulating signal to modulate the optical energy on said bus; and
   detecting means at each of said stations for substantially continuously detecting the presence or absence of a modulated signal on said bus.

2. An optical fiber communication system as claimed in claim 1 wherein said modulating means comprises means for varying the coupling between the input and the output and further including control means at each station for preventing said modulating means from varying the coupling between the input and the output when said detecting means detects a modulated signal on said bus and for enabling said modulating means to vary the coupling when said detecting means detects the absence of a modulated signal on said bus.

3. An optical fiber communication system as claimed in claim 2 wherein said control means includes means for preventing the coupling from being varied for a random period of time before enabling said modulating means when said detecting means detects a modulated signal on said bus.

4. An optical fiber communication system as claimed in claim 1 wherein the means for coupling the input from the bus to the output to the bus comprises a first optical waveguide member connected to said input and a second optical waveguide member connected to said output, said first and second waveguide members being disposed in a coupling region adjacent each other and spaced apart a distance such that coupling therebetween occurs when optical energy is propagating on said bus.

5. An optical fiber communication system as claimed in claim 4 wherein the length of said coupling region is an odd multiple of one half of the coupling distance wherein a signal on one wave guide member would be substantially completely transferred to the other waveguide member.

6. An optical fiber communication system as claimed in claim 4 wherein said modulating means comprises means for varying the optical transmission-characteristics of one of said waveguide members relative to the optical transmission characteristics of the other of said waveguide members.

7. An optical fiber communication system as claimed in claim 1 wherein eachstation comprises a substrate member having said first and second waveguide members formed therein.

8. An optical fiber communication system as claimed in claim 7 wherein said modulating means comprises first and second spaced electrodes formed on said substrate member and overlying said first and second waveguide members.

9. An optical fiber communication system as claimed in claim 7 wherein said substrate member has first and second ends, said waveguide members extending from said first end to said second end, and reflecting means at said second end for reflecting a portion of the optical energy in said waveguide members.

10. An optical fiber communication system as claimed in claim 9 wherein said reflecting means passes a portion of the energy in said waveguide members to said detecting means.

11. An optical fiber communication system having two or more individual stations for the transmission of information signals between the stations comprising:
   an optical fiber bus having a first end and a second end remote from said first end;
   said bus being optically connected to each of said stations by an input to each station and an output from each station;
   a first light source located at said first end for applying light energy to said bus and to each of said stations;

each of said stations having optical coupler means for optically coupling the input from said bus to the output to said bus;

modulating means at each of said stations for varying the coupling between the input and the output in accordance with a modulating signal to modulate the optical energy on said bus from said light source;

collision detecting means at each of said stations for detecting the presence or absence of a modulated signal generated by other stations on said bus; and partially transmissive means at each of said stations for applying a portion of the optical energy from said bus to said detecting means, said partially transmissive means comprising a reflecting member.

12. An optical fiber communication system as claimed in claim 11 and further comprising control means at each of said stations responsive to the energy detected by said collision detecting means for preventing said modulating means from varying the coupling between input and the output when said detecting means detects a modulated signal on said bus and for enabling said modulating means to vary the coupling when said detecting means detects the absence of a modulated signal on said bus.

13. An optical fiber communication system as claimed in claim 11 wherein the optical coupler means at each station for coupling the input from said bus to the output to said bus comprises a first optical waveguide member connected to said input and a second optical waveguide member connected to said output, said first and second waveguide members being disposed in a coupling region adjacent each other and spaced apart a distance such that optical coupling therebetween occurs when optical energy is propagating on said bus.

14. An optical fiber communication system as claimed in claim 13 wherein said first and second waveguide members in said coupling region and said reflecting member form a folded directional coupler.

15. An optical fiber communication system as claimed in claim 11 and further comprising a second light source located at said second end of said bus, an optical detector, and first switch means for switching said second end of said bus between said second light source and said optical detector.

16. An optical fiber communication system as claimed in claim 15 and further comprising a second optical detector located at said first end of said bus and second switch means for switching said first end of said bus between said first light source and said second optical detector.

17. An optical fiber communication system as claimed in claim 16 and further comprising an optical fiber test bus connected between said first and second switch means.

* * * * *